G. S. MOTT.
Duplex Telegraphs.

No. 221,850. Patented Nov. 18, 1879.

Witnesses
Henry Howson Jr.
Harry Smith

Inventor
Garret S. Mott
by his Attorneys
Howson Jr.

UNITED STATES PATENT OFFICE.

GARRET S. MOTT, OF PHILADELPHIA, PENNSYLVANIA.

IMPROVEMENT IN DUPLEX TELEGRAPHS.

Specification forming part of Letters Patent No. 221,850, dated November 18, 1879; application filed June 5, 1879.

*To all whom it may concern:*

Be it known that I, GARRET S. MOTT, of Philadelphia, Pennsylvania, have invented a new and useful Improvement in Duplex-Telegraph Systems, of which the following is a specification.

The object of my invention is to construct a simple and inexpensive duplex-telegraph system which will admit of the transmission of messages simultaneously in opposite directions over one wire.

My invention consists in employing at opposite ends of the line batteries of opposite polarity, which are constantly in circuit through one or more coils of the relays, these batteries being arranged preferably between the grounds and the relays.

My invention also consists in combining with a home circuit and with the line a relay composed of an armature and two independent magnets, one or both of which can be adjusted, and both of which act on the armature in the same direction. The short circuit is made through one magnet and the line-circuit through the other magnet of the relay; or the line-circuit may be made through both magnets of the relay.

Figure 1:
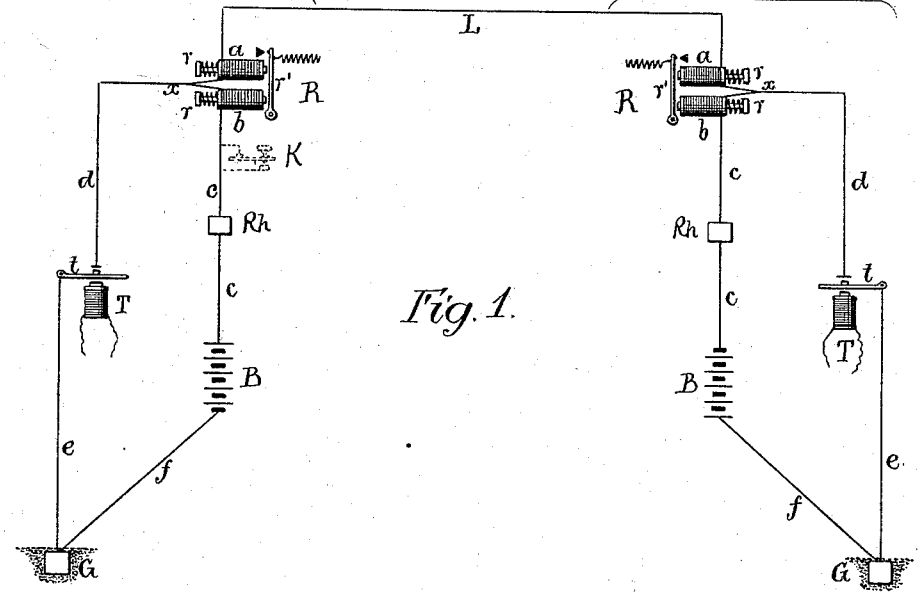
Figure 2:
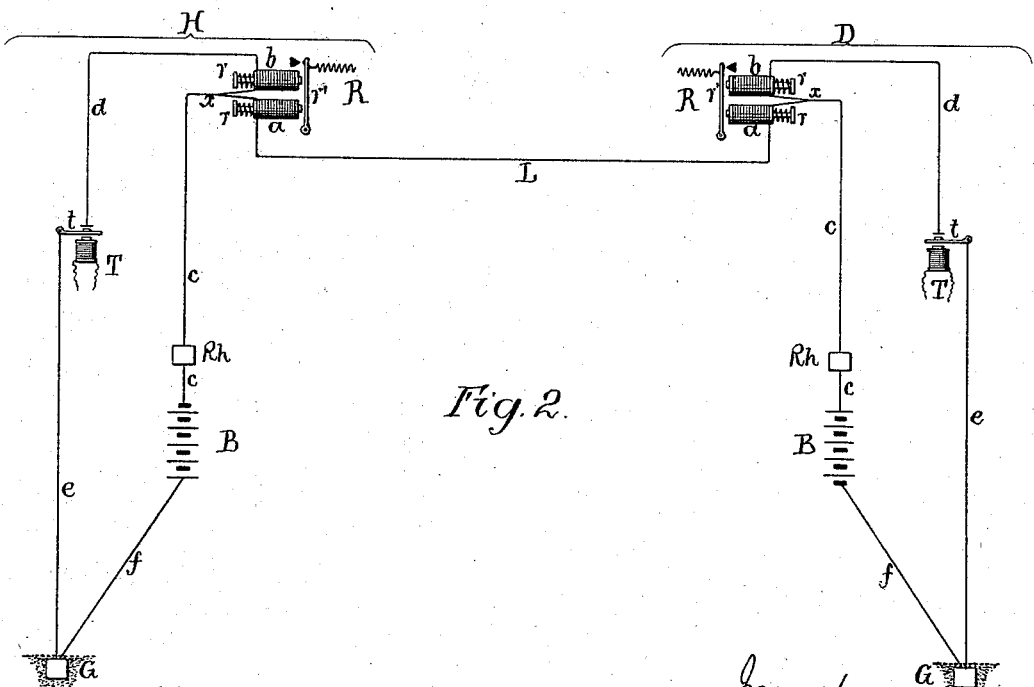

In the accompanying drawings, Figure 1 is a diagram of my improved system of duplex telegraphy, and Fig. 2 a diagram of a modified arrangement.

It may be stated in the outset that the arrangement of transmitter, relay, and circuits at the home station H is exactly the same as that at the distant station D, and hence the following description will apply to the arrangements of parts at both stations.

Referring to Fig. 1, T is the transmitter, which may be operated by a key in a local circuit in the usual manner, the armature $t$ of the transmitter being grounded through the wire $e$. When this armature is raised its upper contact-point is arranged to touch a contact-point on the end of the wire $d$, and make the ground-connection for the latter through the wire $e$.

The wire $d$ is divided at $x$, so as to connect with the coils of two magnets, $a$ and $b$, which, in connection with an armature, $r'$, form the relay R. The wires of both magnets $a$ and $b$ are wound in the same direction, and both act on the one armature of the relay in the same direction; but the two magnets are independent of each other, and one or both can be adjusted by means of ordinary adjusting-screws $r\ r$. The coil $a$ connects with the line L, while the coil $b$ is in communication with the battery B through the wire $c$, the battery being grounded through the wire $f$.

When the armature $t$ of the transmitter is raised the battery is short-circuited through the wire $c$, magnet $b$, wire $d$, and wire $e$ to the ground. When the armature $t$ of the transmitter is depressed the battery is thrown on the line L through the wire $c$ and both magnets $a$ and $b$.

The batteries, which are of opposite polarity, are always in circuit, and are arranged at each station between the relay and the ground.

In order that the armature of the relay at the home station may not be affected by the battery at the home station, but may be affected by a current from the distant station, the spring of the armature and the magnet $b$ are so adjusted that when the home battery is short-circuited the effect on the armature will be nil, and the magnet $a$ is also so adjusted in proportion to the resistance of the line that when the battery is on the line the effect of both magnets, counteracted by the resistance of the line, will also be practically nil, so that the home relay will not be affected by the home battery, no matter whether the latter is on short circuit or on the line; but when the operator at the distant station depresses his key a current from his battery will be thrown on the line, and the combined effect of the two batteries on the magnet or magnets of the relay at the home station will cause the attraction of the armature, and thus record the signals from the distant station, whether the operator at the home station is working his transmitter or not.

The arrangement shown in the diagram, Fig. 2, is substantially the same as that shown in Fig. 1, except that the positions of the magnets $a$ and $b$ at each station are changed, so that while the short circuit is made through the magnet $b$, as before, the line-circuit is made through the magnet $a$ only, instead of through both magnets. This necessitates a somewhat different adjustment of the magnets in respect to the armature; but the operation is the same as that described above.

In order to prevent a too rapid consumption of the battery when the latter is short-circuited, I prefer to arrange on the wire $c$ a small resistance-box, R $h$. A small resistance-box may be put on the wire $d$, so as to insure a slight leakage onto the line L.

It will be seen, however, that the large rheostats by which the required balance of the armature of the relay is usually obtained are dispensed with, and that in my system the balance is obtained by means of the independent adjustable magnets arranged as described. Moreover, owing to the absence of these large rheostats almost the entire effect of the batteries is utilized for working the line.

If desired, a key may be substituted for the transmitter at the home station, and the signals will thus be made by drawing the battery off the line by the depression of the home key, instead of by the raising of the transmitter-armature, in which case the signal would have to be given on the back stroke of the armature of the relay at the distant station.

The line may be singled up for ordinary Morse transmission by closing the local key, thus pressing down the armature of the transmitter, and connecting a key, K, with the line $c$, as indicated by dotted lines in Fig. 1.

I claim as my invention—

1. A duplex-telegraph system in which the armature of the relay is combined with two independent magnets, one or both of which are adjustable, and both of which are arranged to act on the said armature in the same direction, all substantially as described.

2. In a duplex-telegraph system, the combination of the line and short circuits with relays, each consisting of two independent adjustable magnets and an armature, the short circuit being made through one magnet and the line-circuit through the other magnet, or through both magnets, of the relay, as set forth.

3. A duplex-telegraph system in which the batteries of opposite polarity at opposite ends of the line are constantly in circuit through one or more coils of the relays.

In testimony whereof I have signed my name to this specification in the presence of two subscribing witnesses.

G. S. MOTT.

Witnesses:
WILLIAM J. COOPER,
HARRY SMITH.